(12) United States Patent
Chang et al.

(10) Patent No.: US 8,297,497 B2
(45) Date of Patent: Oct. 30, 2012

(54) TRANSMITTING DEVICE, RECEIVING DEVICE, SCREEN FRAME TRANSMISSION SYSTEM AND METHOD

(75) Inventors: Kuo-Lung Chang, Junghe (TW); Hsing-Yung Wang, Junghe (TW); Kuan-Yu Chou, Junghe (TW)

(73) Assignee: Awind, Inc., Junghe, Taipei County (TW)

( * ) Notice: Subject to any disclaimer, the term of this patent is extended or adjusted under 35 U.S.C. 154(b) by 126 days.

(21) Appl. No.: 13/025,212

(22) Filed: Feb. 11, 2011

(65) Prior Publication Data

US 2012/0205431 A1 Aug. 16, 2012

(51) Int. Cl.
*G06F 17/00* (2006.01)
(52) U.S. Cl. ........................................... 235/375
(58) Field of Classification Search .................. 235/375
See application file for complete search history.

(56) References Cited

U.S. PATENT DOCUMENTS 7,472,821 B1 * 1/2009 Buchanan ..................... 235/375
* cited by examiner

*Primary Examiner* — Jamara Franklin
(74) *Attorney, Agent, or Firm* — Muncy, Geissler, Olds & Lowe, PLLC

(57) ABSTRACT

A screen frame transmission system includes a receiving device and a transmitting device. The receiving device includes a display unit or an external display device for displaying a 2D bar code containing connection information. The transmitting device includes an image capturing unit for capturing an image of the 2D bar code. The transmitting device decodes the 2D bar code to obtain the connection information and establishes a communication connection with the receiving device therewith to transmit a screen frame, thereby simplifying operations of a user.

26 Claims, 4 Drawing Sheets

# TRANSMITTING DEVICE, RECEIVING DEVICE, SCREEN FRAME TRANSMISSION SYSTEM AND METHOD

BACKGROUND OF THE INVENTION

1. Field of the Invention

The present invention relates to a transmitting device, receiving device, screen frame transmission system and method, and more particularly to a transmitting device, receiving device, screen frame transmission system and method allowing a user to establish a communication connection more easily.

2. Description of the Prior Art

Screen frame sharing is an important application of information technology, examples of which include remote desktop control, wirelessly connecting a computer to a projector for presentation and so on. Also, as portable devices with photograph and video capturing capabilities gaining their popularity, the size limit of their display units cause a rapid increase in need for users to share the images taken.

However, before a screen frame can be transmitted, a user must first correctly set connection information so that a transmitting end and a receiving end can establish a communication connection. For example, the user would have to know the correct IP address of the receiving device, input it to the transmitting device, and then the transmitting device can establish the communication connection with the receiving device. Such task is quite difficult for users who are not familiar with how to operate a computer.

In summary, it is highly desirable to achieve establishing a communication connection between a transmitting end and a receiving end, and transmitting screen frames through simple operations of a user.

SUMMARY OF THE INVENTION

The present invention is directed to a transmitting device, receiving device, screen frame transmission system and method, wherein the receiving end converts connection information into a 2D bar code, and the transmitting end obtains a required connection information through capturing an image of the 2D bar code, establishes a communication connection therewith and transmits screen frames, thereby simplifying operations of a user.

According to an embodiment, the screen frame transmission system includes a receiving device and a transmitting device. The receiving device includes a display unit or a video port, a first communication interface and a first processing unit. The video port is for electrically connecting with an external display device. The display unit or the display device is for displaying a 2D bar code containing connection information. The first communication interface is for receiving a screen frame. The first processing unit is electrically connected with the first communication interface, and the display unit or the video port, for generating the 2D bar code and decoding the screen frame to be output by the display unit or the display device. The transmitting device includes an image capturing unit, a second communication interface and a second processing unit. The image capturing unit is for capturing the 2D bar code output from the display unit or the display device. The second communication interface is for transmitting the screen frame. The second processing unit is electrically connected with the image capturing unit and the second communication interface, for decoding the 2D bar code to obtain the connection information, and establishing a communication connection with the receiving device with the connection information to transmit the screen frame.

According to an embodiment, a transmitting device works with a receiving device to form a screen frame transmission system. The transmitting device includes an image capturing unit, a communication interface and a processing unit. The image capturing unit is for capturing a 2D bar code displayed by the receiving device. The 2D bar code contains connection information. The communication interface is for transmitting the screen frame to the receiving device. The processing unit is electrically connected with the image capturing unit and the communication interface, for decoding the 2D bar code to obtain the connection information, and establishing a communication connection with the receiving device with the connection information to transmit the screen frame.

According to an embodiment, a receiving device works with a transmitting device to form a screen frame transmission system. The receiving device includes a display unit or a video port, a communication interface and a processing unit. The video port is for electrically connecting with an external display device. The display unit or the display device is for displaying a 2D bar code containing connection information. The communication interface is for receiving a screen frame transmitted by the transmitting device. The processing unit is electrically connected with the communication interface, and the display unit or the video port, for generating the 2D bar code and decoding the screen frame to be output by the display unit or the display device.

According to an embodiment, a computer readable media is recorded thereon a computer program to be loaded by a transmitting device to execute a method of transmitting a screen frame to a receiving device. The method includes capturing a 2D bar code displayed by the receiving device with an image capturing unit, the 2D bar code containing connection information; decoding the 2D bar code to obtain the connection information; establishing a communication connection with the receiving device with the connection information; and capturing and transmitting the screen frame.

According to an embodiment, a computer readable media is recorded thereon a computer program to be loaded by a receiving device to execute a method of receiving a screen frame from a transmitting device. The method includes determining connection information; converting the connection information into a 2D bar code; displaying the 2D bar code with a display unit or an external display device to allow the transmitting device to capture the 2D bar code; and waiting for the screen frame transmitted by the transmitting device for output.

The objective, technologies, features and advantages of the present invention will become more apparent from the following description in conjunction with the accompanying drawings, wherein certain embodiments of the present invention are set forth by way of illustration and examples.

DESCRIPTION OF THE PREFERRED EMBODIMENT

Figure 1:
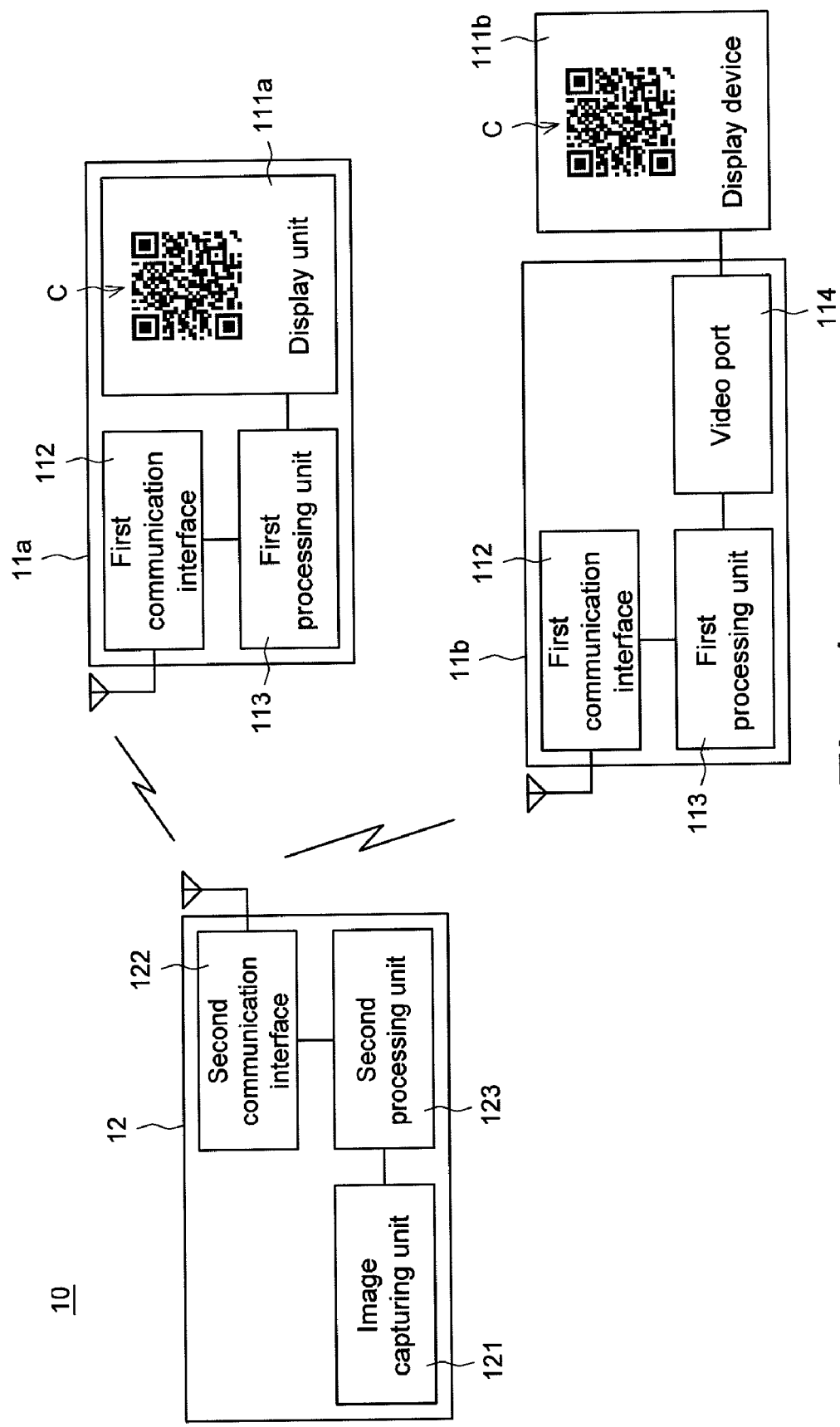
FIG. 1 is a block diagram illustrating the screen frame transmission system according to an embodiment of the present invention.

Referring to FIG. 1, according to an embodiment, the screen frame transmission system 10 includes a receiving device 11a and a transmitting device 12. The receiving device 11a includes a display unit 111a, a first communication interface 112 and a first processing unit 113. The first processing unit 113 is electrically connected with the display unit 111a, and converts connection information required by the transmitting device 12 into a 2D bar code C for the display unit 111a to output. For example, the 2D bar code C may be a QR code (quick response code). In addition, the first processing unit 113 is also connected with the first communication interface 112 to control the first communication interface 112 receiving a screen frame transmitted by the transmitting end, and then the display unit 111a output the screen frame.

The transmitting device 12 includes an image capturing unit 121, a second communication interface 122 and a second processing unit 123 electrically connected with the image capturing unit 121 and the second communication interface 122. The second processing unit 123 controls the image capturing unit 121 to capture the 2D bar code output by the display unit 111a of the receiving device 11a and decodes it to obtain the connection information required to establish a communication connection with the receiving device. The second processing unit 123 may then establish the communication connection with the receiving device 11a based on the connection information decoded from the 2D bar code C and transmit screen frames. Method of capturing and transmitting a screen frame may be implemented with existing technologies by people of ordinary skill in the art, and the description thereof is omitted here.

According to an embodiment, the first communication interface 112 and the second communication interface 122 may be a wireless LAN (local area network) interface under such as an IEEE 802.11 communication standard. The transmitting device 12 may then use an IP address (Internet Protocol address) to establish the communication connection with the receiving device 11a. For example, the receiving device 11a may be a display device with a network interface, such as a display, television set, projector and tablet PC; the transmitting device 12 may be a portable electronic device with an image capturing unit and a network interface, such as a mobile phone, PDA (personal digital assistant), tablet PC, laptop computer and desktop computer.

According to another embodiment, the receiving device only includes a first communication interface 112, a first processing unit 113 and a video port 114, and does not include a display unit 111a, such as the receiving device 11b shown in FIG. 1. The receiving device 11b may connect with an external display device 111b through the video port 114. In this way, the receiving device 11b may output the 2D bar code containing the connection information from the external display device 111b. Coupled with the aforementioned framework, a display device 111b without a network interface may also serve as a receiving end of screen frame sharing. Examples of the video port 114 include a VGA (Video Graphics Array) connector, DVI (digital visual interface), HDMI (high definition multimedia interface), component video connector, S-Video connector and AV connector (composite video connector), etc.

Figure 2:
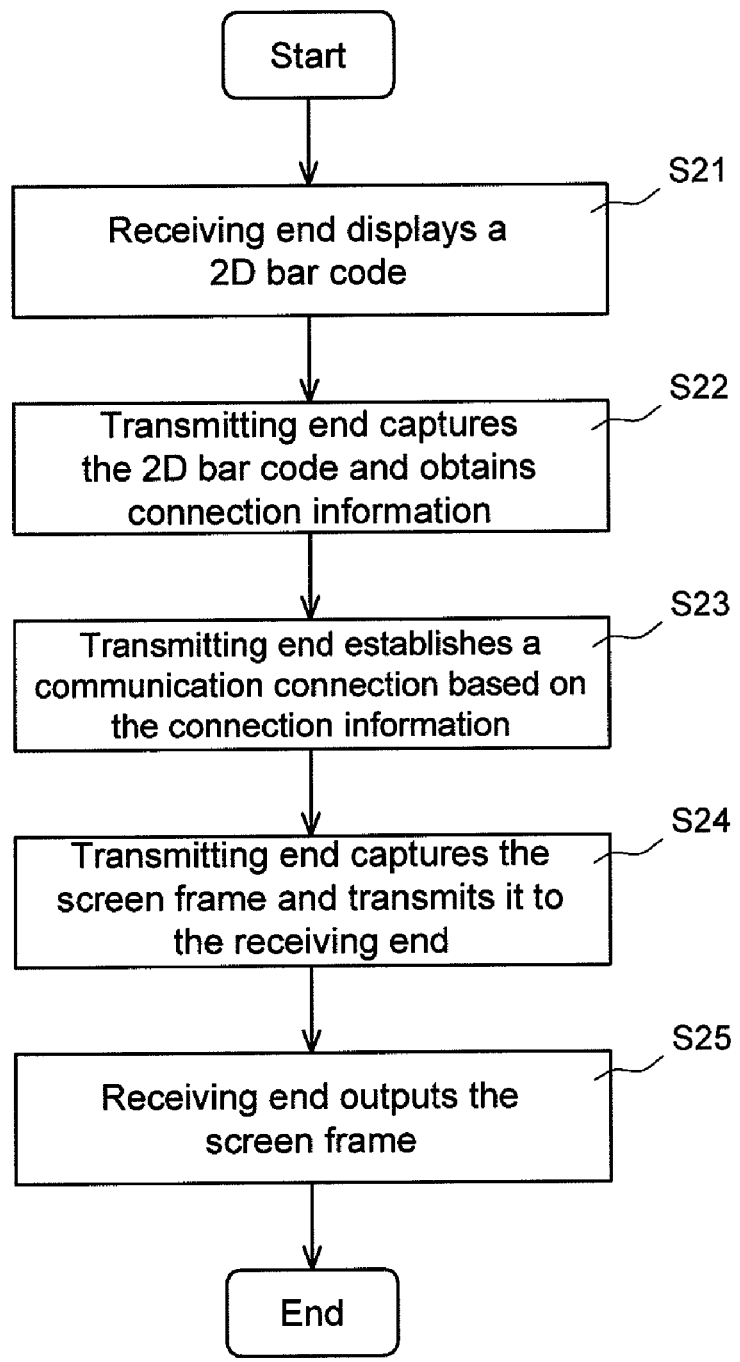
FIG. 2 is a flow chart illustrating the screen frame transmission method according to an embodiment of the present invention.

Referring to FIG. 2, there is illustrated an operation flow of the screen frame transmission system 10. First, the receiving end (such as the receiving device 11a, 11b) outputs a 2D bar code C with the display unit 111a or the external display device 111b (S21). The transmitting end (such as the transmitting device 12) captures an image of the 2D bar code C with the image capturing unit 121, and decodes the 2D bar code C to obtain connection information required (S22). Then, the transmitting end establishes a communication connection with the receiving end based on the decoded connection information from the 2D bar code C. Thereafter, the transmitting end may capture a screen frame and transmit it to the receiving end (S24). The receiving end receives and outputs the screen frame transmitted by the transmitting end (S25).

Figure 3:
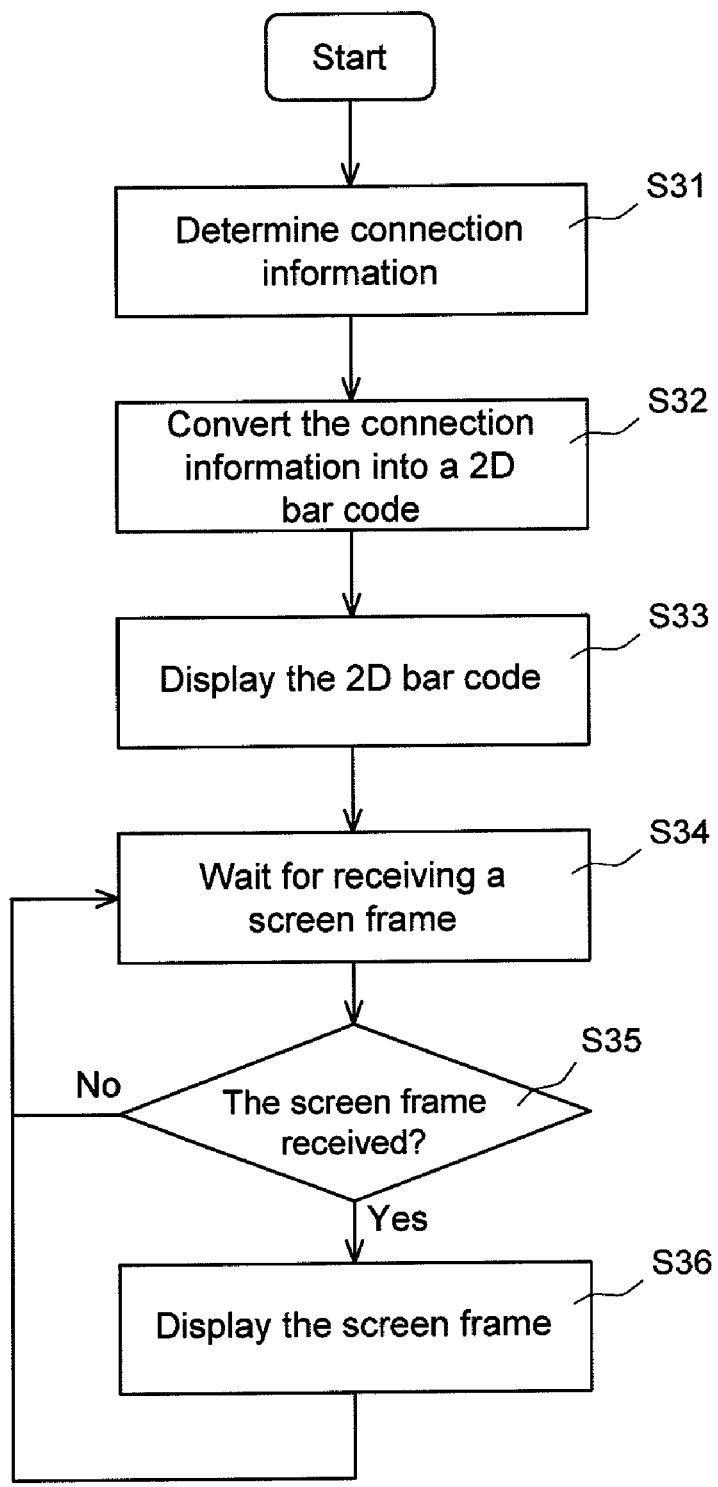
FIG. 3 is a flow chart illustrating the method of receiving a screen frame transmitted by the transmitting device executed by the receiving device.

Referring to FIG. 3 for description below, there is illustrated an operation flow of the receiving end. First, the receiving end determines connection information (S31). For example, the receiving device may obtain an IP address preset, or dynamically assigned through DHCP (dynamic host configuration protocol). According to an embodiment, the receiving device may be an AP (access point) of a wireless LAN, and therefore, the connection information also includes a SSID (service set identifier) of the AP. For security purpose, the connection information may further include a connection password of the AP. Moreover, the receiving device may randomly generate an ID (identification) code, and the transmitting device is required to input the correct ID code generated by the receiving device before it can use the display unit 111a or display device 111b of the receiving end to output the screen frame transmitted.

Next, the receiving device converts the required connection information based on the network settings of the user into a 2D bar code C (S32), such as a QR code and then outputs it with the display unit 111a or display device 111b (S33). Thereafter, the receiving device waits for the screen frame to be transmitted by the transmitting device (S34), and determines if the screen frame is received (S35). If so, the receiving device outputs the screen frame with the display unit 111a or the display device 111b; if not, the receiving device returns to the step S34 and waits for the screen frame transmitted by the transmitting device.

Figure 4:
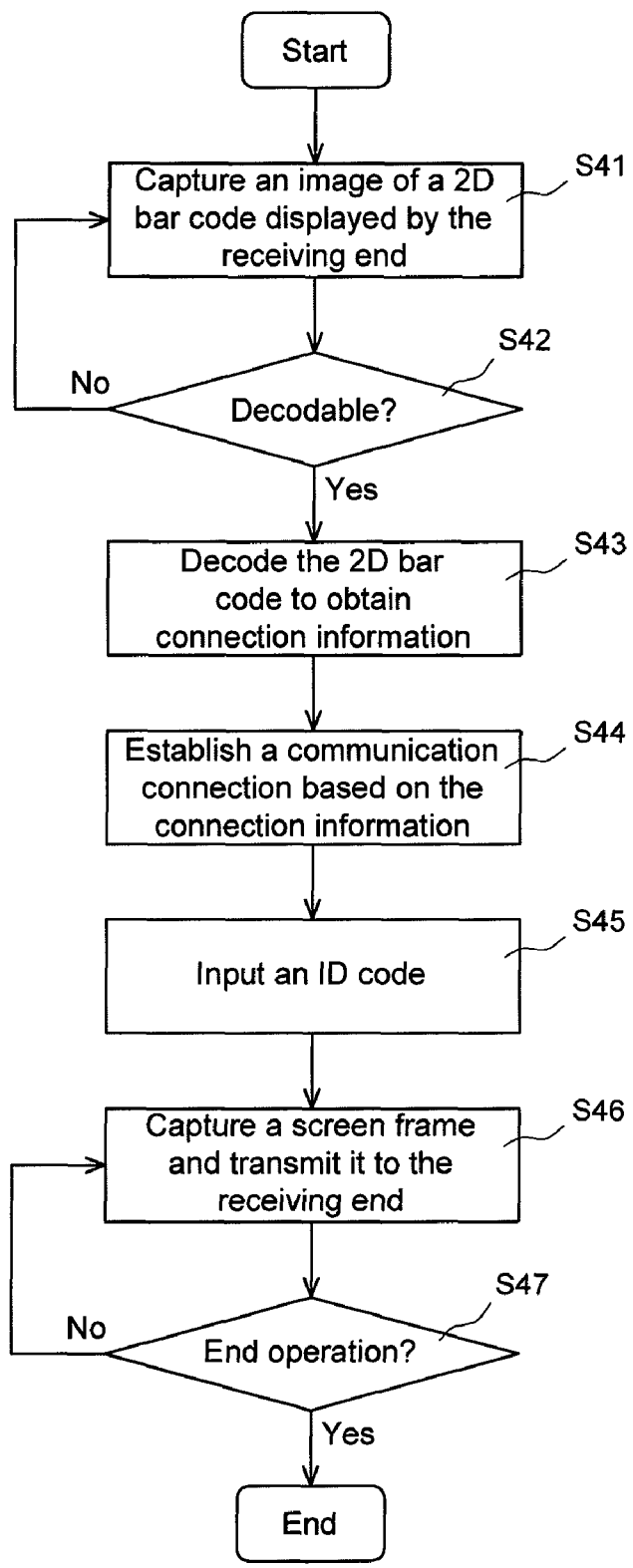
FIG. 4 is a flow chart illustrating the method of transmitting a screen frame to the receiving device executed by the transmitting device.

Referring to FIG. 4 for description below, there is illustrated an operation flow of the transmitting end. First, the transmitting device 12 captures an image of the 2D bar code C displayed by the receiving end with the image capturing unit 121 (S41), and then decodes the captured 2D bar code to obtain the connection information required to establish the communication connection with the receiving end (S43), such as the IP address, SSID, connection password and ID code. Preferably, before decoding the 2D bar code, the transmitting device determines if the captured image is sufficiently clear or complete for decoding. If so, the transmitting device decodes the 2D bar code (S43); if not, he transmitting device returns to the step S41 to re-capture the image of the 2D bar code C.

Continuing the above description, after the transmitting device 12 obtains the connection information, it may establish the communication connection with the receiving end based on the connection information (S44). For example, the transmitting device 12 may establish the communication connection with the receiving end using the IP address. Alternatively, the transmitting device 12 may first establish a communication connection with the AP using the SSID and the connection password, and then with the receiving device using the IP address. If the receiving end has been configured an ID code, the transmitting end would have to further input the ID code in the 2D bar code C (S45) in order to gain access to the display unit 111*a* or the display device 111*b*. Thereafter, the transmitting device 12 may capture a screen frame and transmit it to the receiving end (S46). Finally, the transmitting device determines if the user has end the screen frame transmission operation (S47). If so, end the operation; if not, return to the step S46, and continue to capture the screen frame and transmit it to the receiving end.

According to an embodiment, a computer readable media is recorded thereon a computer program which may be loaded by a transmitting device to execute a method of transmitting a screen frame to a receiving device. The steps of the screen frame transmitting method of the transmitting device have been illustrated in FIG. 4 and the detailed description thereof is omitted here. According to another embodiment, a computer readable media is recorded thereon a computer program which may be loaded by a receiving device to execute a method of receiving a screen frame transmitted by a transmitting device. The steps of the screen frame receiving method have been illustrated in FIG. 3, and the detailed description thereof is omitted here.

To summarize the foregoing description, the transmitting device, receiving device, screen frame transmission system and method of the present invention operate in the following manner: the receiving end converts connection information into a 2D bar code, and outputs it with a display unit or an external display device; the transmitting end may then captures an image of the 2D bar code to obtain the connection information required, and then establish a communication connection and transmit a screen frame. Hence, with the present invention, a user can establish the communication connection between the transmitting end and the receiving end and starts screen sharing in a breeze.

While the invention is susceptible to various modifications and alternative forms, a specific example thereof has been shown in the drawings and is herein described in detail. It should be understood, however, that the invention is not to be limited to the particular form disclosed, but to the contrary, the invention is to cover all modifications, equivalents, and alternatives falling within the spirit and scope of the appended claims.

What is claimed is:

1. A screen frame transmission system comprising:
    a receiving device comprising:
        a display unit, or a video port for electrically connecting with an external display device, wherein the display unit or the display device is for displaying a 2D bar code comprising connection information;
        a first communication interface for receiving a screen frame; and
        a first processing unit electrically connected with the first communication interface, and the display unit or the video port, for generating the 2D bar code and decoding the screen frame to be output by the display unit or the display device; and
    a transmitting device comprising:
        an image capturing unit for capturing the 2D bar code output from the display unit or the display device;
        a second communication interface for transmitting the screen frame; and
        a second processing unit electrically connected with the image capturing unit and the second communication interface, for decoding the 2D bar code to obtain the connection information, and establishing a communication connection with the receiving device with the connection information to transmit the screen frame.

2. The screen frame transmission system according to claim 1, wherein the 2D bar code comprises a QR code.

3. The screen frame transmission system according to claim 1, wherein the first communication interface and the second communication interface comprise a wireless LAN interface.

4. The screen frame transmission system according to claim 3, wherein the connection information comprises an IP address.

5. The screen frame transmission system according to claim 4, wherein the connection information further comprises at least one of a SSID, a connection password and an ID code.

6. A transmitting device working with a receiving device to form a screen frame transmission system, the receiving device displaying a 2D bar code comprising connection information and a screen frame transmitted by the transmitting device, the transmitting device comprising:
    an image capturing unit for capturing the 2D bar code;
    a communication interface for transmitting the screen frame to the receiving device; and
    a processing unit electrically connected with the image capturing unit and the communication interface, for decoding the 2D bar code to obtain the connection information, and establishing a communication connection with the receiving device with the connection information to transmit the screen frame.

7. The transmitting device according to claim 6, wherein the 2D bar code comprises a QR code.

8. The transmitting device according to claim 6, wherein the communication interface comprises a wireless LAN interface.

9. The transmitting device according to claim 8, wherein the connection information comprises an IP address.

10. The transmitting device according to claim 9, wherein the connection information further comprises at least one of a SSID, a connection password and an ID code.

11. A receiving device working with a transmitting device to form a screen frame transmission system, the transmitting device capturing and decoding a 2D bar code to obtain connection information, and establishing a connection with the receiving device with the connection information to transmit a screen frame, the receiving device comprising:
    a display unit, or a video port for electrically connecting with an external display device, wherein the display unit or the display device is for displaying a 2D bar code comprising the connection information;
    a communication interface for receiving the screen frame; and
    a processing unit electrically connected with the communication interface, and the display unit or the video port, for generating the 2D bar code and decoding the screen frame to be output by the display unit or the display device.

12. The receiving device according to claim 11, wherein the 2D bar code comprises a QR code.

13. The receiving device according to claim 11, wherein the communication interface comprises a wireless LAN interface.

14. The receiving device according to claim 13, wherein the connection information comprises an IP address.

15. The receiving device according to claim 14, wherein the connection information further comprises at least one of a SSID, a connection password and an ID code.

16. A computer readable media with a recorded computer program to be loaded by a transmitting device to execute a method of transmitting a screen frame to a receiving device comprising:
  capturing a 2D bar code displayed by the receiving device with an image capturing unit, the 2D bar code comprising connection information;
  decoding the 2D bar code to obtain the connection information;
  establishing a communication connection with the receiving device with the connection information; and
  capturing and transmitting the screen frame.

17. The computer readable media according to claim 16 further comprising:
  determining whether the captured 2D bar code can be decoded, if not, re-capturing the 2D bar code.

18. The computer readable media according to claim 16, wherein the 2D bar code comprises a QR code.

19. The computer readable media according to claim 16, wherein the transmitting device establishes the communication connection with the receiving device with a wireless LAN interface.

20. The computer readable media according to claim 19, wherein the connection information comprises an IP address.

21. The computer readable media according to claim 20, wherein the connection information further comprises at least one of a SSID, a connection password and an ID code.

22. A computer readable media with a recorded computer program to be loaded by a receiving device to execute a method of receiving a screen frame from a transmitting device comprising:
  determining connection information;
  converting the connection information into a 2D bar code;
  displaying the 2D bar code with a display unit or an external display device to allow the transmitting device to capture the 2D bar code; and
  waiting for the screen frame transmitted by the transmitting device for output.

23. The computer readable media according to claim 22, wherein the 2D bar code comprises a QR code.

24. The computer readable media according to claim 22, wherein the transmitting device establishes a communication connection with the receiving device with a wireless LAN interface.

25. The computer readable media according to claim 24, wherein the connection information comprises an IP address.

26. The computer readable media according to claim 25, wherein the connection information further comprises at least one of a SSID, a connection password and an ID code.

\* \* \* \* \*